United States Patent
Dolan et al.

(10) Patent No.: US 7,686,385 B2
(45) Date of Patent: Mar. 30, 2010

(54) FLEXIBLE TRUCK SKIRT WITH FLOATING MOUNT

(75) Inventors: Robert A. Dolan, Gilbert, AZ (US); David L. Simpson, Higley, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 153 days.

(21) Appl. No.: 11/347,400

(22) Filed: Feb. 2, 2006

(65) Prior Publication Data
US 2007/0176466 A1  Aug. 2, 2007

(51) Int. Cl.
*B62D 33/00* (2006.01)
(52) U.S. Cl. ...................................... 296/191
(58) Field of Classification Search .......... 296/191, 296/198, 183.1, 209, 901.01; 52/169.12, 52/DIG. 3
See application file for complete search history.

(56) References Cited

U.S. PATENT DOCUMENTS

| | | | |
|---|---|---|---|
| 3,775,917 A | | 12/1973 | Struben |
| 4,115,974 A | * | 9/1978 | Purcell .................... 52/512 |
| 4,529,244 A | * | 7/1985 | Zaydel ..................... 296/191 |
| 4,573,733 A | * | 3/1986 | Zaydel ..................... 296/191 |
| 4,616,869 A | * | 10/1986 | Sacco et al. ............. 296/180.1 |
| 4,973,102 A | * | 11/1990 | Bien ...................... 296/187.01 |
| D313,954 S | | 1/1991 | Fingerle |
| 4,998,769 A | * | 3/1991 | Johnson et al. .......... 296/183.1 |
| D319,036 S | | 8/1991 | Fingerle |
| 5,098,765 A | * | 3/1992 | Bien ......................... 428/134 |
| 5,226,695 A | * | 7/1993 | Flint et al. ................. 296/191 |
| 5,228,742 A | * | 7/1993 | Johnson et al. ............ 296/191 |
| 5,947,551 A | * | 9/1999 | Uloth ........................ 296/198 |
| 6,095,594 A | * | 8/2000 | Riddle et al. .............. 296/191 |
| D433,365 S | | 11/2000 | Beigel |
| 6,347,829 B1 | * | 2/2002 | Hanyu ....................... 296/210 |
| 6,394,537 B1 | * | 5/2002 | DeRees ...................... 296/191 |
| 6,722,730 B2 | | 4/2004 | Lydan et al. |
| 6,755,460 B1 | * | 6/2004 | Marrs et al. ............. 296/187.12 |
| 6,769,853 B2 | * | 8/2004 | Perrot ........................ 411/553 |

(Continued)

FOREIGN PATENT DOCUMENTS

JP    2002019574    1/2002

OTHER PUBLICATIONS

Translation of JP2002019574.*

(Continued)

*Primary Examiner*—Dennis H Pedder
(74) *Attorney, Agent, or Firm*—Richard E. Oney; Tiffany & Bosco, P.A.

(57) ABSTRACT

A vehicle skirt panel assembly includes a skirt panel comprising a thermoplastic material and including a plurality of panel sections each having one or more ribs on its exterior. The skirt panel is mounted to the vehicle so the skirt panel projects below the side of the vehicle and the skirt panel can move relative to the vehicle to allow for thermal expansion and contraction of the skirt panel without deforming the skirt panel. One or more struts are mounted between the vehicle and a lower portion of the skirt panel. The strut is adjustable and is deformable to absorb an impact to the exterior of the skirt panel. The strut is bendable by hand to allow the skirt panel to be returned to the original position.

18 Claims, 7 Drawing Sheets

U.S. PATENT DOCUMENTS

| | | |
|---|---|---|
| D499,679 S | 12/2004 | Perfetti et al. |
| 6,871,904 B2 * | 3/2005 | Bhat et al. ............... 296/183.1 |
| 7,040,682 B2 * | 5/2006 | Tokumoto et al. .......... 296/1.08 |
| 7,163,258 B2 * | 1/2007 | Dyer et al. .................. 296/191 |
| 7,168,757 B2 * | 1/2007 | Futatsuhashi ............... 296/209 |
| 2007/0120397 A1 * | 5/2007 | Layfield et al. .......... 296/180.4 |
| 2007/0132278 A1 * | 6/2007 | Lester et al. ................ 296/191 |

OTHER PUBLICATIONS

Machine translation dated Aug. 21, 2008 of the Isuzu Motors Ltd document cited by applicant on Feb. 2, 2006.*

* cited by examiner

FLEXIBLE TRUCK SKIRT WITH FLOATING MOUNT

BACKGROUND

This invention relates generally to skirts for a trucks or moving vans. More particularly, it relates to a durable and flexible skirt for a truck or moving van that can deform to absorb impact and be easily returned to its original shape. The skirt is floatably mounted to the truck or van body to allow for thermal expansion and contraction of the skirt.

Rental industry trucks or moving vans generally have enclosed bodies positioned behind a cab and are typically used by do-it-yourself renters or transporters. Generally, these trucks include a truck body skirt that extends downward from each side of the truck body to cover the region below the truck body. The truck body skirt reduces turbulent air flow around the truck body, thereby reducing aerodynamic drag and improving fuel efficiency, and also improves the appearance of the truck. Previously, these skirts have comprised laminated panels made of wood-based material, such as laminates of wood or fiberglass reinforced plywood (FRP), covered with an outer gel coat to protect the skirt from the elements. Wood-based skirts used in the past have experienced problems related to impact damage and moisture absorption. While the outer gel-coated surfaces of these panels are reasonably durable, damage and de-lamination of the layered wood interior has been a cause of significant repair expense. Aluminum skirts have also been used, but aluminum skirts are expensive to fabricate and are difficult to repair, such as when the skirt is damaged by an impact, because the aluminum skirt deforms on impact and cannot readily be reformed to its original shape.

There is a need, therefore, for an improved truck body skirt for covering the region below the side of a truck or moving van. It is a general object of the present invention to provide such a skirt.

A more particular object of the present invention is to provide a truck body skirt that is relatively inexpensive to fabricate and is durable and easy to repair.

Another object of the invention is to provide a skirt that is deformable to absorb impact and that can be easily reformed to its original shape.

Still another object of the present invention is to provide a system for mounting such a skirt to a truck or moving van.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a vehicle skirt panel assembly including a skirt panel and means for mounting the skirt panel to the vehicle such that when the skirt panel is mounted to the vehicle the skirt panel projects below the side of the vehicle and the skirt panel can move relative to the vehicle to allow for thermal expansion and contraction of the skirt panel without deforming the skirt panel.

According to one aspect of the invention, the skirt panel comprises a thermoplastic material and includes a plurality of panel sections each having one or more ribs on its exterior.

According to another aspect of the invention, the means for mounting the skirt panel can include a strut mounted between the vehicle and a lower portion of the skirt panel, which is deformable to absorb an impact to the exterior of the skirt panel. The strut is reformable by hand to allow the skirt panel to be returned to the original position. The strut also can be adjustable. In a preferred embodiment, the strut is made of aluminum and is of sufficiently light gauge so that it is bendable by hand.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of our invention, as illustrated in the accompanying drawings. While we will describe our invention more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon our invention.

Figure 1:
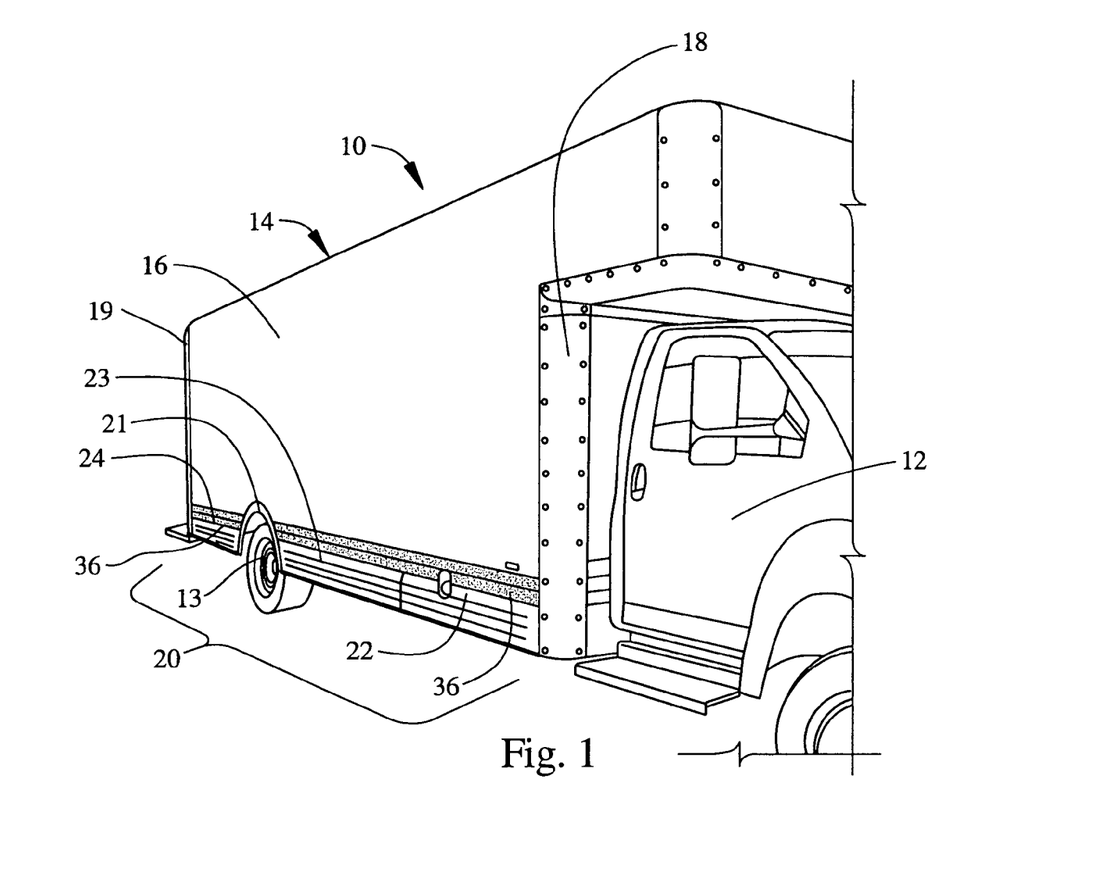
FIG. 1 is a front perspective view of a portion of a truck showing a skirt mounted to the truck in accordance with the present invention.
Figure 2:
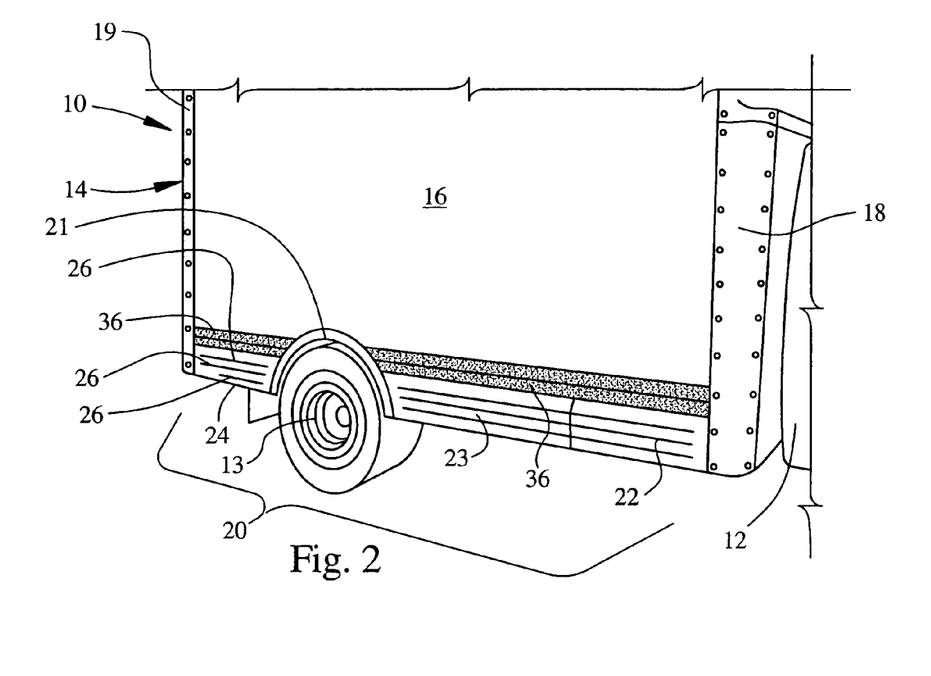
FIG. 2 is front a perspective view showing a skirt mounted to another truck in accordance with the present invention.

Each of FIGS. 1 and 2 shows the rear portion of a truck 10 including a cab 12 and a body 14 positioned behind the cab 12 and enclosing a cargo space (not shown). The truck body 14 has a right side 16 and a left side (not shown) and front corner posts 18 and rear corner posts 19. The truck body side 16 typically is made of FRP and the corner posts 18, 19 typically are made of aluminum. The truck body 14 includes a truck deck 34 (see FIG. 5). A rub rail 36, typically made of aluminum, is attached to the truck deck 34 and the truck body side 16 and generally runs the length of the truck body 14. In accordance with the present invention there is provided a skirt panel 20 comprising a front skirt panel section 22, a middle skirt panel section 23 and a rear skirt panel section 24. Each of the skirt panel sections 22, 23, 24 is floatably attached to the truck body side 16, as described in more detail below. In the embodiment of FIG. 2, the skirt panel 20 is shown in three sections, with the portion of the skirt panel forward the rear wheel 13 being in two sections 22, 23. In an alternative embodiment, the skirt panel portion forward the rear wheel 13 could be manufactured as one section. Production and repair of the skirt panel forward the rear wheel 13 are easier, however, if it is formed in two sections, as shown in FIG. 2.

In a preferred embodiment, the skirt panel sections 22, 23, 24 are fabricated of a thermoformed plastic. The plastic thermoformed skirt panels are attractive, flexible and water and impact resistant. Plastic is an advantageous alternative to wood-based skirts because plastic is not subject to moisture damage or de-lamination. Plastic is also colored through rather than surface colored, which helps to hide gouge marks and other damage that would otherwise reveal substrates of a different color.

Figure 3:
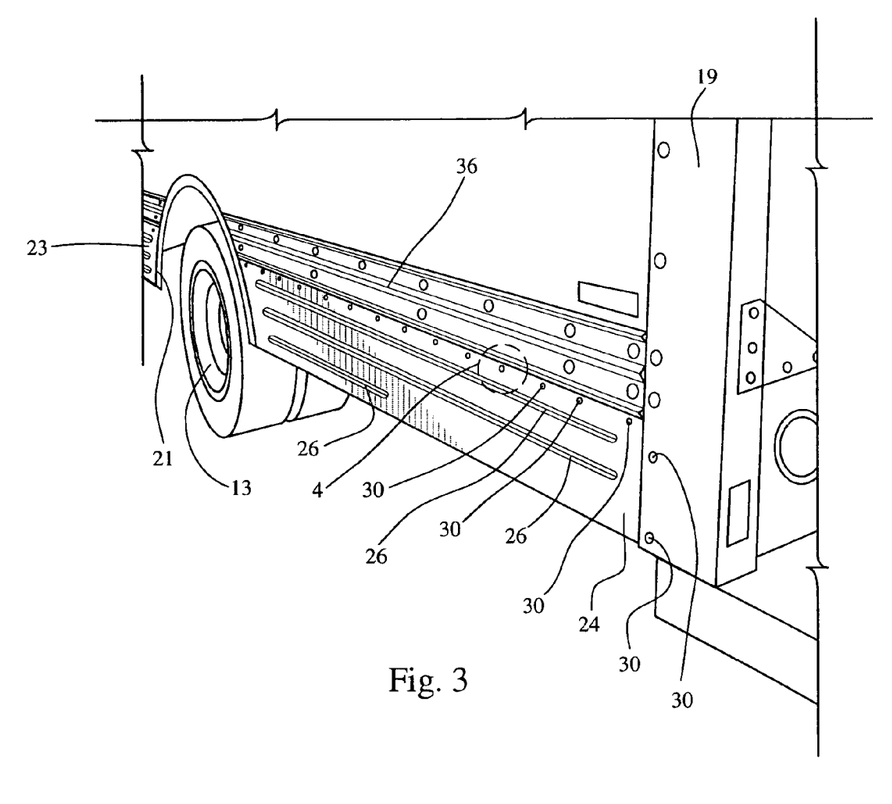
FIG. 3 is a rear perspective view of a portion of the truck of FIG. 1 showing the rear section of the skirt in more detail.

Referring to FIG. 3, the skirt of FIG. 2 is shown in more detail. Skirt panel sections 22, 23, 24 are formed with ribs 26 that protrude outward from the skirt panel sections 22, 23, 24. The ribs 26 help to stiffen the skirt panel sections 22, 23, 24 and also help to preserve the overall surface and appearance of the skirt panel 20 by absorbing the initial impact of objects impacting the skirt panel 20. The skirt panel sections 22, 23, 24 are formed with fastener holes to accommodate fasteners 30 for mounting the skirt panel sections 22, 23, 24 to the rub rail 36. The top of each of the skirt panel sections 22, 23, 24 is mounted to the rub rail 36. The front end of the front skirt panel section 22 is mounted to the front corner post 18, and the rear end of the a middle skirt panel section 23 is mounted to the rear wheel well extrusion piece 21, which typically is made of aluminum. The front end of the rear skirt panel section 24 also is mounted to the rear wheel well extrusion piece 21, and the rear end of the rear skirt panel section 24 is mounted to the rear corner post 19. Because changes in temperature cause the plastic skirt panels 22, 23, 24 to expand and contract more than the truck body parts to which they are mounted (e.g., aluminum parts), a mounting system that holds the skirt panels in position on the truck while still allowing for the varying thermal expansion of the skirt and the truck body is desirable. Therefore, fasteners 30 that produce little or no clamping force are preferred for mounting the skirt panel sections 22, 23, 24. The fastener holes in the skirt panels 22, 23, 24 are oversized to allow some "play" between the fasteners 30 and the skirt panels. In this configuration, the skirt panel sections 22, 23, 24 are floatably attached to the truck body 14, thereby allowing the skirt panel 20 to freely expand and contract in response to thermal changes. This reduces buckling or waving of the skirt panel 20 that can occur due to stresses resulting from restriction of such thermal expansion and contraction.

Figure 4:
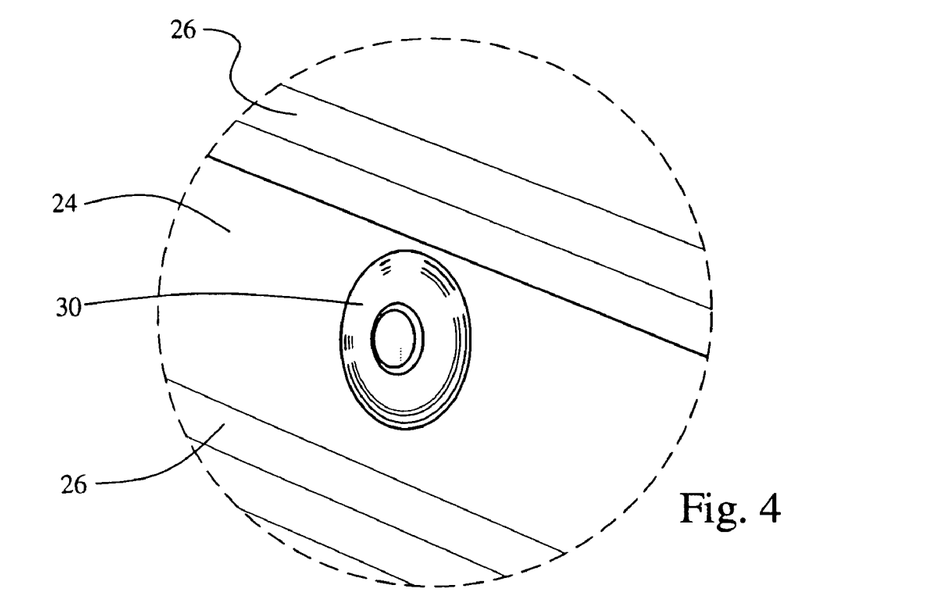
FIG. 4 is an enlarged view of a portion of FIG. 3 showing the exterior view of a drive rivet used to mount the skirt panel according to one embodiment of the invention.
Figure 6:
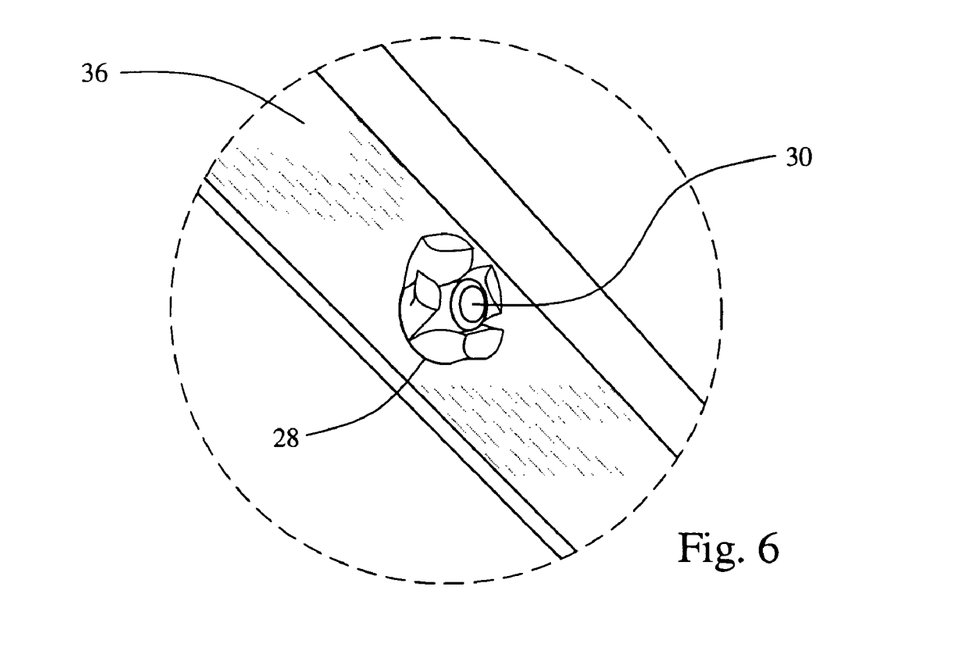
FIG. 6 is an enlarged view of a portion of FIG. 5 showing the interior view of a drive rivet used to mount the skirt panel according one embodiment of the invention.
Figure 9:
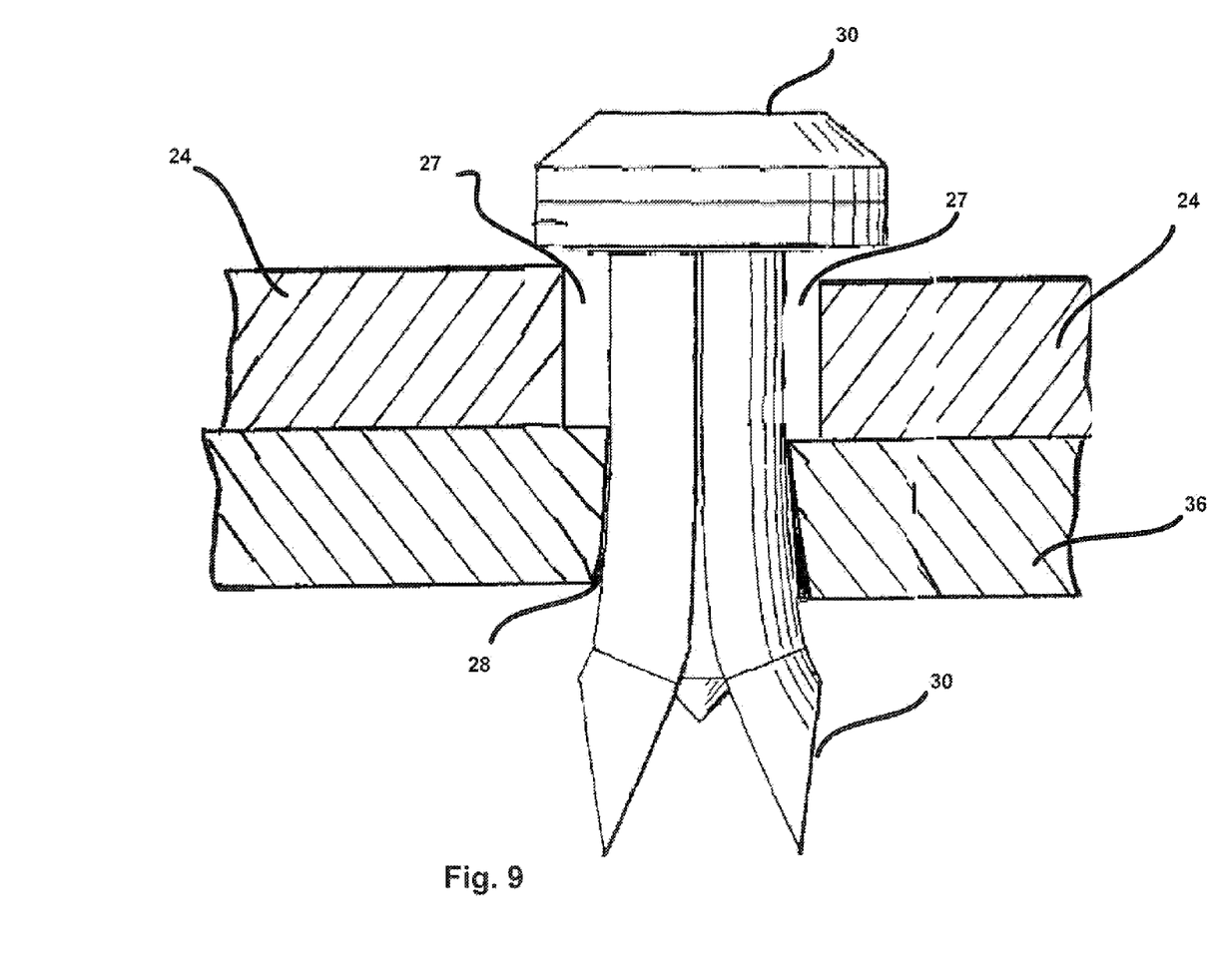
FIG. 9 is a top view, in partial cross-sectional, showing the drive rivet of FIG. 4 mounting the skirt panel to the side of a vehicle.

In one preferred embodiment, shown in FIGS. 4, 6 and 9, the fasteners 30 are drive rivets that are inserted through the skirt panel fastener holes 27 and aligned holes 28 in the rub rail 36 with the rivet head visible on the exterior of the skirt panel. The fastener hole 27 in the skirt panel section 22, 23, 24 is sized larger than the rivet shank and the rivet is of sufficient length so that the skirt panel section 22, 23, 24 is not tightly clamped against the truck body, thereby providing the "play" for the skirt panel thermal expansion and contraction, as described above. FIG. 4 shows the exterior view of a drive rivet used to mount a skirt panel section, FIG. 6 shows the interior view of the drive rivet and FIG. 9 shows a top view of the drive rivet with the skirt panel and truck body in cross-section, according to such an embodiment. Upon reading this disclosure, it will be apparent to those of skill in the art that a variety of other suitable fastener types also can be used for mounting the skirt panel sections to the truck body in such a fashion, including pop rivets and threaded fasteners and washers that provide limited clamping of the skirt panel sections against the truck body.

Figure 5:
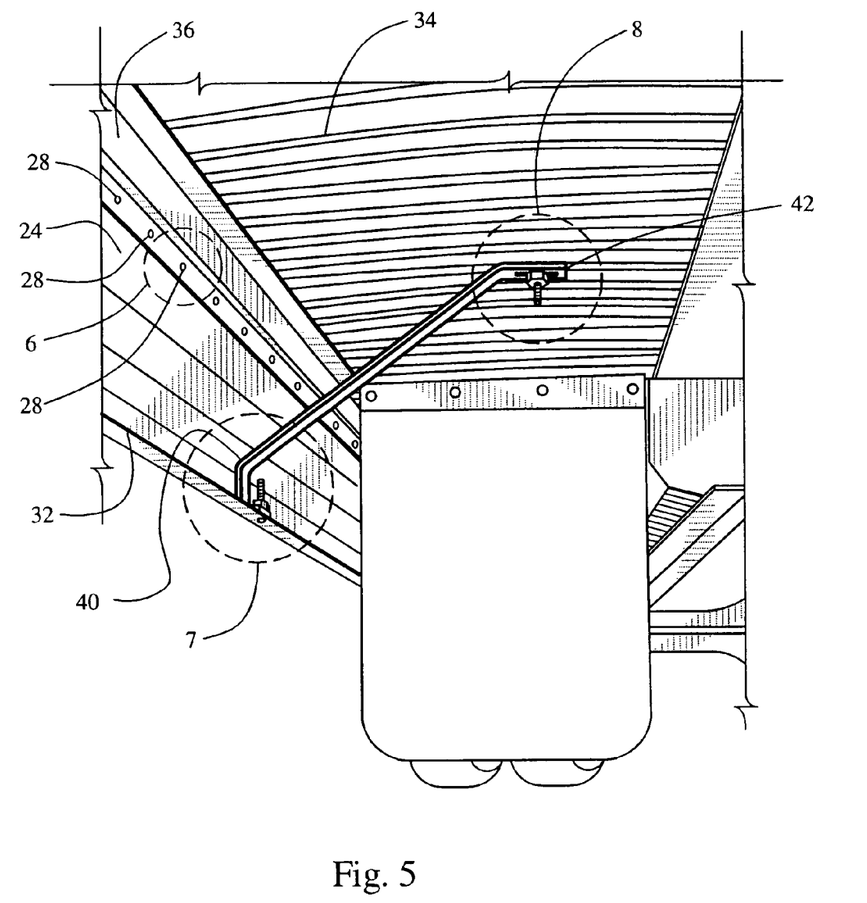
FIG. 5 is a rear perspective view of the bottom of the truck of FIG. 2 showing a support strut positioned behind the rear tires and attached to the skirt panel rear section and to the bottom of the truck deck.
Figure 7:
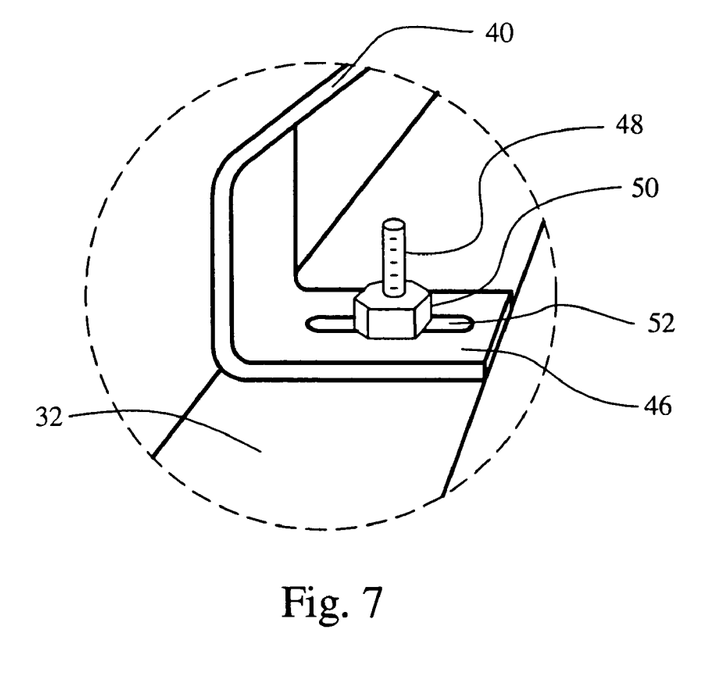
FIG. 7 is an enlarged view of a portion of FIG. 5 showing the lower foot of the support strut attached to the bottom of the truck deck.
Figure 8:
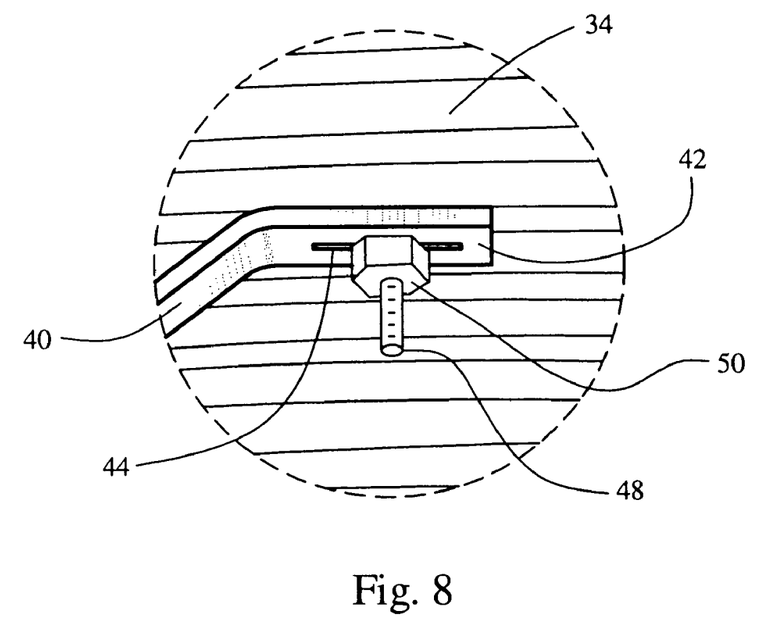
FIG. 8 an enlarged view of a portion of FIG. 5 showing the upper foot of the support strut attached to the skirt panel.

Referring to FIGS. 5, 7 and 8, Stabilizing struts 40 are used to stabilize and maintain the straightness of the skirt panel sections 22, 23, 24. Each skirt panel section 22, 23, 24 includes a bottom flange 32 disposed along the length of the panel and projecting inwardly and below the truck deck 34, as shown in FIG. 5. In a preferred embodiment, the stabilizing strut 40 is in the form of an angular brace have an upper foot 42 with a slotted hole 44 and a lower foot 46 in the shape of an L-bracket and having a slotted hole 52. The strut upper foot 42 is securely mounted to the bottom of the truck deck 34 using a bolt 48 inserted through a hole in the truck deck and through the slotted hole 44 and secured with a washer and nut 50. The strut lower foot 46 is securely mounted to the skirt panel section flange 32 using a bolt 48 inserted through a slotted hole 52 in the skirt panel section flange 32 and secured with a washer and nut 50. In this configuration, the position of the strut can be adjusted so that the skirt panel can be supported in a straight position.

The struts are bendable so that they will deform to absorb the impact of objects striking the skirt panels and so that they can be bent back into their original position after such an impact. In a preferred embodiment, the stabilizing struts 40 are made of aluminum of sufficiently light gauge so that they can be bent by hand. Upon reading this specification, those of skill in the art will understand that other materials also may be used for the struts, such as light gauge steel, provided that the struts give way upon impact and also are easily bendable so that they can be readily reformed to their original shape, preferably by hand. In this configuration, if the skirt panels are sufficiently impacted, the struts readily give way, but are easily hand straightened to restore the flexible plastic skirts to proper alignment.

From the foregoing, it can be seen that the skirt assembly of the present invention possesses numerous advantages. It is relatively inexpensive to fabricate and is durable. It is not susceptible to moisture damage, delamination or cracking as are previous wood-based skirts and can last for the lifetime of the vehicle. It is easy to install and repair. It is deformable to absorb impact, yet it can be returned to its original shape by hand.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:
1. A vehicle skirt panel assembly comprising:
a flexible skirt panel; and
means for mounting the skirt panel to the vehicle such that when the skirt panel is mounted to the vehicle the skirt panel projects below the side of the vehicle and the skirt panel can move relative to the vehicle to allow for thermal expansion and contraction of the skirt panel without deforming the skirt panel;
wherein the means for mounting the skirt panel to the vehicle includes a fastener and a fastener hole in the skirt panel;

wherein the fastener cooperates with the fastener hole so that the skirt panel is loosely clamped against the side of the vehicle; and wherein the means for mounting the skirt panel includes a strut mounted between the vehicle and the skirt panel, wherein the strut is deformable to absorb an impact to the exterior of the skirt panel and is reformable by hand to allow the skirt panel to be returned substantially to an original position of the skirt panel before the impact.

2. The vehicle skirt panel assembly of claim 1 wherein the strut includes at least one slot for adjustably mounting the strut.

3. The vehicle skirt panel assembly of claim 1 wherein the skirt panel comprises a thermoplastic material.

4. The vehicle skirt panel assembly of claim 1 wherein the skirt panel comprises at least one rib on the exterior of the skirt panel.

5. The vehicle skirt panel assembly of claim 1 wherein the skirt panel comprises a plurality of panel sections.

6. A vehicle skirt panel assembly comprising:
   a flexible skirt panel having means for mounting the skirt panel to the vehicle body so that a lower portion of the skirt panel projects below the side of the vehicle; and
   a strut for supporting the lower portion of the skirt panel in position relative to the vehicle body;
   wherein the strut is deformable to absorb an impact to the exterior of the skirt panel and is reformable by hand.

7. The vehicle skirt panel assembly of claim 6 wherein the strut comprises a metal.

8. The vehicle skirt panel assembly of claim 6 wherein the strut the metal comprises aluminum.

9. The vehicle skirt panel assembly of claim 6 wherein the strut includes at least one slot for adjustably mounting the strut.

10. The vehicle skirt panel assembly of claim 6 wherein the flexible skirt panel comprises a thermoplastic material.

11. The vehicle skirt panel assembly of claim 6 wherein the skirt panel comprises at least one rib on the exterior of the skirt panel.

12. The vehicle skirt panel assembly of claim 6 wherein the skirt panel comprises a plurality of panel sections.

13. A vehicle skirt panel assembly comprising:
    a flexible skirt panel mounted to the vehicle so that the skirt panel projects below the side of the vehicle; and
    deformable support means for holding the skirt panel, wherein the deformable support means includes a strut coupled between the skirt panel and the bottom of a truck deck of the vehicle;
    wherein the strut can bend upon an impact to the skirt panel and is reformable by hand to allow the skirt panel to be returned substantially to an original position of the skirt panel before the impact.

14. The vehicle skirt panel assembly of claim 13 wherein the strut comprises a metal.

15. The vehicle skirt panel assembly of claim 14 wherein the metal comprises aluminum.

16. The vehicle skirt panel assembly of claim 13 wherein the flexible skirt panel comprises a thermoplastic material.

17. The vehicle skirt panel assembly of claim 13 wherein the skirt panel comprises at least one rib on the exterior of the skirt panel.

18. The vehicle skirt panel assembly of claim 13 wherein the skirt panel comprises a plurality of panel sections.

* * * * *